US010040258B2

(12) United States Patent
Sanchez Gomez et al.

(10) Patent No.: US 10,040,258 B2
(45) Date of Patent: Aug. 7, 2018

(54) METHOD FOR OBTAINING A COMPOSITE LAMINATE

(71) Applicant: Airbus Operations S.L., Getafe (ES)

(72) Inventors: Jose Sanchez Gomez, Getafe (ES);
Rafael Avila Dominguez, Getafe (ES);
Hector Alonso Pintado, Getafe (ES)

(73) Assignee: Airbus Operations S.L., Getafe (ES)

( * ) Notice: Subject to any disclaimer, the term of this patent is extended or adjusted under 35 U.S.C. 154(b) by 505 days.

(21) Appl. No.: 14/700,634

(22) Filed: Apr. 30, 2015

(65) Prior Publication Data

US 2015/0314539 A1 Nov. 5, 2015

(30) Foreign Application Priority Data

Apr. 30, 2014 (EP) .................... 14382159

(51) Int. Cl.
| | | |
|---|---|---|
| *B29C 70/54* | (2006.01) | |
| *B29C 70/30* | (2006.01) | |
| *B29K 105/08* | (2006.01) | |
| *B29C 70/38* | (2006.01) | |
| *B29C 35/02* | (2006.01) | |

(52) U.S. Cl.
CPC .............. *B29C 70/54* (2013.01); *B29C 70/30* (2013.01); *B29C 70/543* (2013.01); *B29C 35/0261* (2013.01); *B29C 70/388* (2013.01); *B29K 2105/0881* (2013.01); *Y10T 156/12* (2015.01)

(58) Field of Classification Search
CPC ....... B29C 70/54; B29C 70/30; B29C 70/543; B29C 65/08; B65B 51/225
USPC ...................................................... 156/73.1
See application file for complete search history.

(56) References Cited

U.S. PATENT DOCUMENTS

| | | | |
|---|---|---|---|
| 4,704,172 A | 11/1987 | Katz | |
| 4,735,753 A | 4/1988 | Ackermann | |
| 5,039,371 A * | 8/1991 | Cremens | ................. B29C 33/02 156/285 |
| 6,033,203 A | 3/2000 | Christensen | |
| 6,432,236 B1 | 8/2002 | Leemon | |
| 6,511,563 B2 * | 1/2003 | Roylance | ............ B29C 66/8244 156/308.2 |
| 7,892,372 B2 * | 2/2011 | Lee | ........................ B23K 20/10 156/64 |
| 2002/0112804 A1* | 8/2002 | Woods | ................ B29C 66/1122 156/73.1 |
| 2011/0108188 A1 | 5/2011 | Lengsfeld | |

(Continued)

FOREIGN PATENT DOCUMENTS

| | | |
|---|---|---|
| CN | 103264509 | 8/2013 |
| WO | 2013071422 | 5/2013 |

OTHER PUBLICATIONS

European Search Report, dated Oct. 23, 2014.

*Primary Examiner* — James Sells
(74) *Attorney, Agent, or Firm* — Greer, Burns & Crain Ltd.

(57) ABSTRACT

A method for obtaining a composite piece of n plies, at least one ply having a fiber volume greater than 58% in weight, the method comprising the steps of laying uncured prepreg plies and performing ultrasound compaction over each laid uncured laminate ply, wherein at least one of the uncured laminate plies has a fiber volume greater than 58% in weight. Finally, the composite laminate is cured. The step of performing ultrasound compaction comprises applying an ultrasonic compactor over each laid laminate ply.

6 Claims, 2 Drawing Sheets

(56) References Cited

U.S. PATENT DOCUMENTS

2012/0040106 A1   2/2012  Simmerer
2014/0033653 A1   2/2014  Cham
2014/0327187 A1  11/2014  Hurdle

* cited by examiner

METHOD FOR OBTAINING A COMPOSITE LAMINATE

CROSS-REFERENCES TO RELATED APPLICATIONS

This application claims the benefit of the European patent application No. 14382159.3 filed on Apr. 30, 2014, the entire disclosures of which are incorporated herein by way of reference.

BACKGROUND OF THE INVENTION

The present invention belongs to the field of composite elements manufacturing, in particular obtaining a composite laminate with a high fiber volume.

In composite materials field, a "prepreg" is a unidirectional or oriented arrangement of composite fibers, which are pre-impregnated with an uncured resin, usually partially reacted. The prepreg is as flexible as fibers are, but the fibers cannot move with respect to each other, unless the prepreg is torn, because the resin, despite not being cured, provides an enough strong joint between them.

Prepreg plies are usually stacked one on top of another to form a prepreg laminate. The laminate is then formed and cured to produce the final composite material part. The mechanical properties of the cured part are provided mostly by the fibers in the part. The resin component of the prepreg plies is responsible for providing the necessary tacking during the stacking of the uncured prepreg plies in order to achieve a proper compaction in the laminate. Once a laminate is cured, its porosity must be lower than 2% in order for it to be used in an aeronautic part.

As prepreg plies are made up of fibers impregnated by a resin, if the resin content increases, the fiber content will decrease and vice versa. In most applications, especially aeronautic applications, high mechanical properties are sought. In order to achieve the best mechanical properties possible, the fiber volume must be as high as possible. This, however, means a low resin volume which can be a problem as it will not provide the necessary tacking for a proper compaction of the laminate. This can lead to a higher porosity level than 2% which would result in an unacceptable part for aeronautic purposes. A high porosity level can even cause delamination in the part.

Current manufacturing processes use prepreg plies with a fiber volume lower than 55%, because a higher fiber volume causes a porosity value greater than 2% when curing said pieces, which will lead to delamination.

Document CN103264509 discloses a method of manufacturing a composite element with a fiber volume greater than 60%, but it uses a method of resin injection, which is not compatible with the use of composite prepregs.

The problem to solve is how to achieve an uncured composite laminate with a fiber volume greater than 58% with tacking enough to give rise to a cured composite piece with a porosity value lower than 2%, so that curing this laminate would not lead into delamination due to low tacking level.

Another problem to solve is preventing degradation, which is caused by an excessive heating of the uncured composite laminate before being cured.

SUMMARY OF THE INVENTION

A first inventive aspect of the invention provides a method for obtaining a composite piece having a fiber volume greater than 58% in weight and with a porosity value lower than 2%, comprising the obtaining of a composite uncured laminate of n plies, at least one ply having a fiber volume greater than 58% in weight, the method comprising the steps of:

laying a first prepreg ply over a working surface or a previously cured piece;

performing ultrasound compaction over the first prepreg ply, the first prepreg ply thus becoming the last compacted prepreg ply;

laying a new prepreg ply over the last compacted prepreg ply;

performing ultrasound compaction over the new prepreg ply, the new prepreg ply thus becoming the last compacted prepreg ply;

repeating the steps c. and d. for n−2 additional times; and curing the composite uncured laminate of n plies;

wherein n is a natural number equal or greater than 1, wherein at least one of the prepreg plies has a fiber volume greater than 58% in weight, and wherein the steps b. and d. of performing ultrasound compaction over a prepreg ply comprise at least applying an ultrasonic compactor over said prepreg ply, the ultrasonic compactor comprising at least a probe, a probe housing, a booster and a horn.

In a particular embodiment, the step b. is carried out using the following parameters:

the ultrasonic frequency being comprised between 20 and 80 kHz;

the ultrasonic waves amplitude being comprised between 70 and 100% of the amplitude of the movement of the ultrasonic compactor;

the booster ratio being comprised between 1:1.5 and 1:3;

the layup speed of the ultrasonic compactor being comprised between 50 and 180 mm/s;

the compaction pressure being comprised between 30 and 150 bar;

the ultrasonic compactor contact area being comprised between 50 and 200 mm2;

the horn width being comprised between 5 and 30 mm; and the probe housing angle respect the working surface, or the previously cured piece, being comprised between 15° and 65°.

In a particular embodiment, step b. further comprises applying a heating unit before performing ultrasound compaction over the laid prepreg ply.

In a particular embodiment, the step b. further comprises applying a cooling unit after performing ultrasound compaction over the laid prepreg ply.

In a particular embodiment, the heating unit is an infrared unit.

In a particular embodiment, the step f. comprises curing the composite uncured laminate in a curing machine, such as an oven. In a most preferred embodiment, the curing machine is an autoclave.

Another inventive aspect of the invention provides a machine for implementing the method for obtaining an uncured composite laminate having a fiber volume greater than 58% in weight according to the first inventive aspect, comprising:

a tape supplier, cutting blades, a heating unit, an ultrasonic compactor comprising at least a probe, a probe housing, a booster and a horn, a cooling unit, and a reel for rolling the release paper.

A prepreg ply is a ply of uncured composite material, comprising dry fiber and partially reacted uncured resin. One or more prepreg plies are piled to become an uncured composite laminate.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

Figure 1:
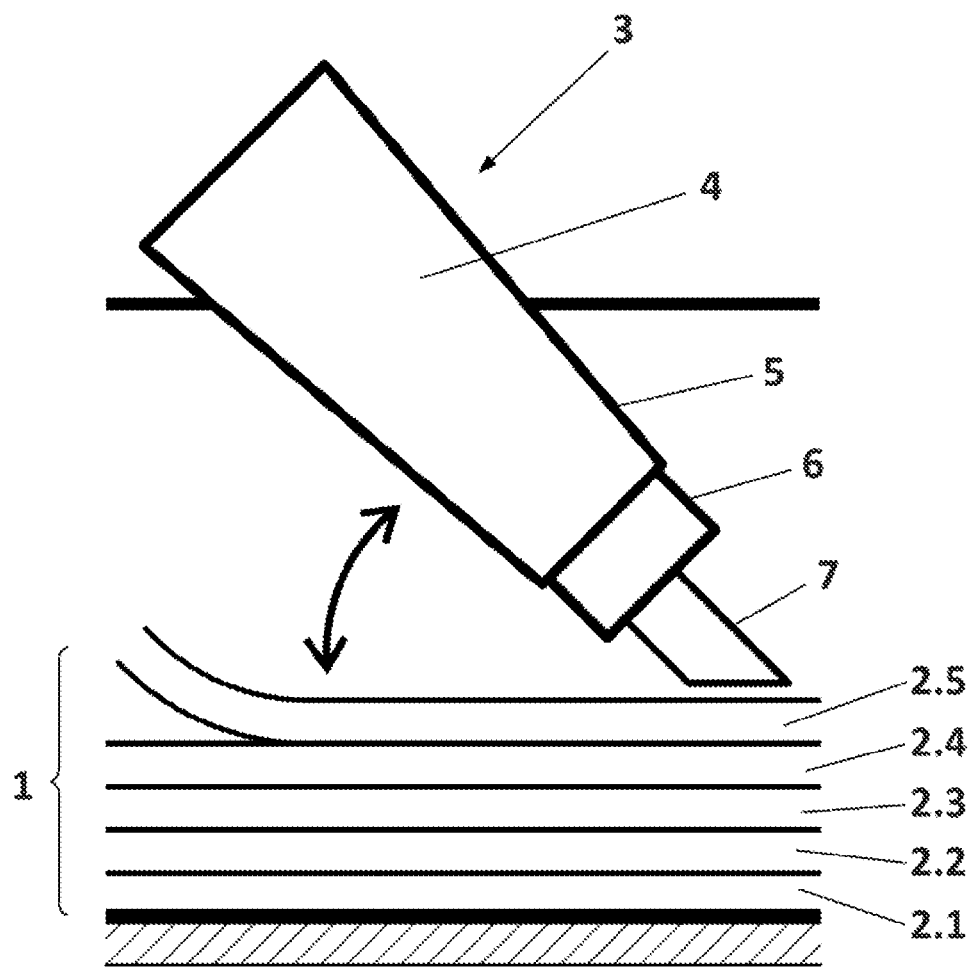
FIG. 1. shows a particular example of an implementation of a method according to the invention.

The invention, in its most general embodiment, presents a method for obtaining a composite piece having a fiber volume greater than 58% in weight and with a porosity value lower than 2%, comprising the obtaining of a composite uncured laminate (1) of n plies (2.1, . . . , 2.*n*), at least one ply having a fiber volume greater than 58% in weight, the method comprising the steps of:

laying a first prepreg ply (2.1) over a working surface or a previously cured piece;

performing ultrasound compaction over the first prepreg ply (2.1), the first prepreg ply (2.1) thus becoming the last compacted prepreg ply;

laying a new prepreg ply (2.2, . . . , 2.*n*) over the last compacted prepreg ply;

performing ultrasound compaction over the new prepreg ply (2.2, . . . , 2.*n*), the new prepreg ply (2.2, . . . , 2.*n*) thus becoming the last compacted prepreg ply;

repeating the steps c. and d. for n−2 additional times; and curing the composite uncured laminate (1) of n plies;

wherein n is a natural number equal or greater than 1, wherein at least one of the prepreg plies (2.1, . . . , 2.*n*) has a fiber volume greater than 58% in weight, and wherein the steps b. and d. of performing ultrasound compaction over a prepreg ply (2.1, . . . , 2.*n*) comprise at least applying an ultrasonic compactor (3) over said prepreg ply (2.1, . . . 2.*n*), the ultrasonic compactor (3) comprising at least a probe (4), a probe housing (5), a booster (6) and a horn (7).

Thus, prepreg plies (2.1, . . . , 2.*n*) are piled one onto the previous one, performing ultrasound compaction after piling each prepreg ply (2.1, . . . , 2.*n*). The first prepreg ply (2.1) is laid onto a working surface, and the following prepreg plies (2.2, . . . , 2.*n*) are laid onto the previous prepreg ply, which has been compacted, and is called the last compacted ply. Unexpectedly, the performing of ultrasound compaction over each prepreg ply (2.1, . . . , 2.*n*) allows curing the composite uncured laminate (1) with a porosity value lower than 2%, despite of its low tacking level.

In a particular embodiment, the first prepreg ply (2.1) is laid over a previously cured piece, instead of the working surface.

FIG. 1 shows a particular example of an implementation of a method according to the invention. In this figure, five prepreg plies (2.1, 2.2, 2.3, 2.4, 2.5) have already been piled and ultrasonic compaction has been performed after laying each one of the first four prepreg plies (2.1, 2.2, 2.3, 2.4). FIG. 1 shows the performing of ultrasonic compaction after laying the fifth prepreg ply (2.5), by means of the ultrasonic compactor (3) comprising a probe (4), a probe housing (5), a booster (6) and a horn (7).

However, not every value has proved to be suitable for achieving this goal. If a too strong ultrasound compaction is performed, the piece is degraded, but if the compaction is not strong enough, the piece will not be properly compacted and an excessive porosity value will appear when curing it.

The strength of the ultrasound compaction is given by the combination of a number of parameters. These parameters must be suitably combined to define a proper compaction performance without degrading the laminate.

It has been observed that several parameters, such as the number of plies of the composite laminate, the amplitude of the ultrasonic waves, and the speed in the lay-up of the ultrasonic compactor have an effect on the final thickness of the composite laminate. The thickness variation during the manufacturing process is related to the level of compaction: parting from a theoretical thickness considered as the sum of the thicknesses of the prepreg plies before being piled, the greater the compaction, the greater the decrease in the final actual thickness, which is the thickness of the prepreg laminate after the piling and ultrasonic compaction of the prepreg plies, but before curing. The higher the number of plies is, the greater the decrease in thickness from its nominal value; the higher the amplitude of ultrasonic waves is, the lower the thickness is achieved; the lower the speed in the lay-up is, the lower the thickness is achieved. These values, however, also have a limit, because the greater the compaction achieved, the higher the risk of degrading the laminate.

Unexpectedly, when the combination of the following parameters is used:

the ultrasonic frequency being comprised between 20 and 80 kHz;

the ultrasonic waves amplitude being comprised between 70 and 100% of the amplitude of the movement of the ultrasonic compactor (3);

the booster ratio being comprised between 1:1.5 and 1:3;

the lay-up speed of the ultrasonic compactor being comprised between 50 and 180 mm/s;

the compaction pressure being comprised between 30 and 150 bar;

the ultrasonic compactor contact area being comprised between 50 and 200 mm2;

the horn width being comprised between 5 and 30 mm; and the probe housing angle respect the working surface, or the previously cured piece, being comprised between 15 and 65°, the prepreg ply is not degraded and despite its low tacking, the composite laminate after being cured, has a porosity value lower than 2%. Using these parameters outside these ranges will lead the piece either to be degraded or not to be able to acquire a proper compaction with a porosity value lower than 2%.

A particular embodiment of the method includes a step of heating the prepreg ply, by means of some heating means (11), before performing the ultrasonic compaction to said prepreg ply (2.1, . . . , 2.n). This previous step helps to improve the behavior of the prepreg ply (2.1, . . . , 2.n), increasing the compaction and reducing the final thickness of the composite laminate (1). In a particular embodiment, the heating means (11) is an infrared unit and heats the prepreg ply (2.1, . . . , 2.n) to a temperature higher than 50° C.

A particular embodiment of the method includes a step of cooling the prepreg ply, by means of some cooling means (12), after performing the ultrasonic compaction to said prepreg ply. This step helps to decrease the risk of the prepreg ply being degraded by the excessive temperature generated by the ultrasound compaction and the heating step, when it takes place. In a particular embodiment, the cooling means (12) is a water circuit that works at a temperature lower than 10° C.

This method, in any of the preceding embodiments, further comprises the step of curing the composite uncured laminate (1) of n plies preferably in a curing machine, such an autoclave. In another embodiment, the composite uncured laminate (1) is cured out of doors.

Figure 2:
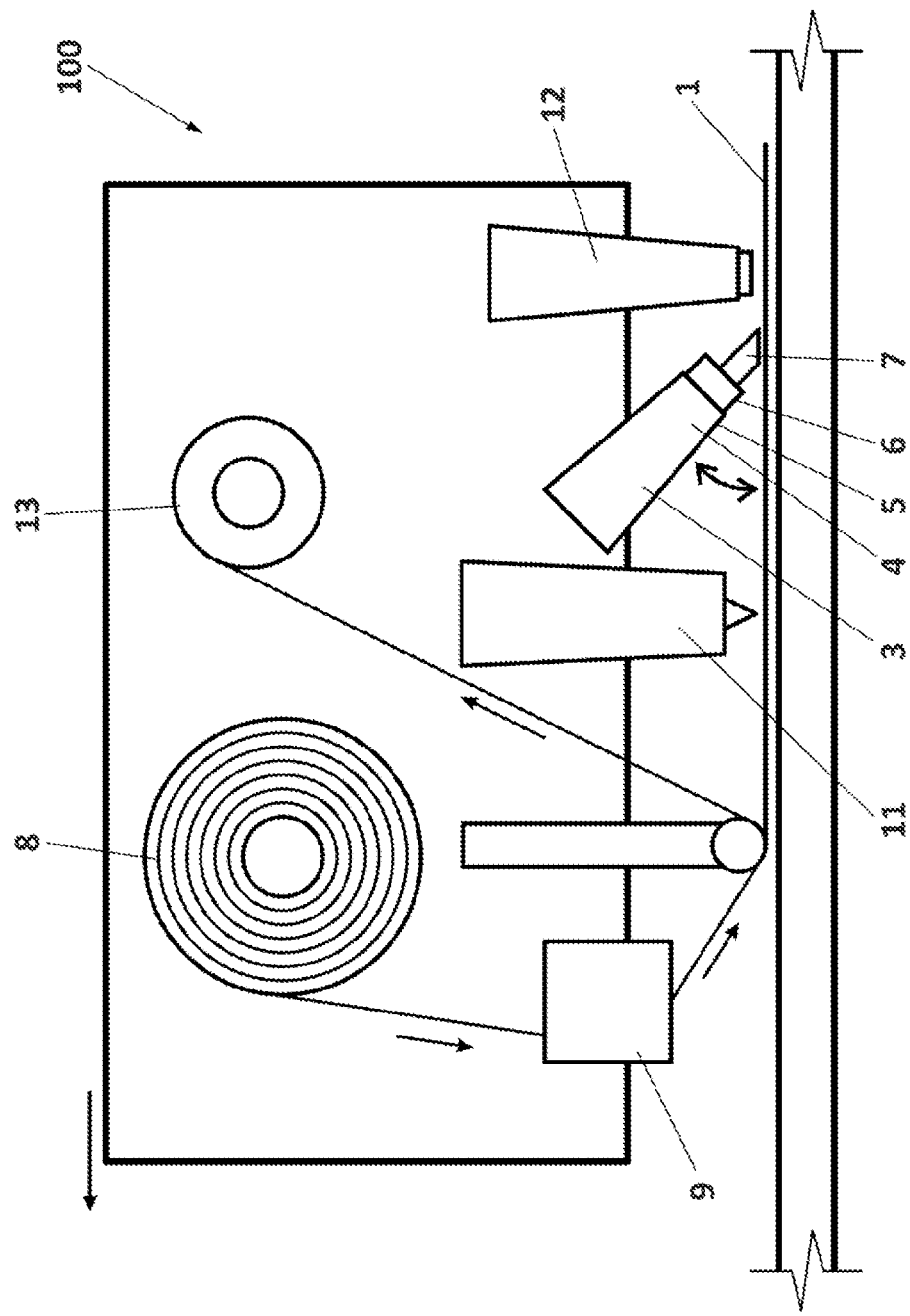
FIG. 2. shows an overview of a machine suitable for obtaining a composite uncured laminate of n plies with a porosity lower than 2%, at least one ply having a fiber volume greater than 58% in weight according to the invention.

FIG. 2 shows an overview of a machine (100) suitable for obtaining a composite piece of n plies with a porosity value lower than 2%, at least one ply having a fiber volume greater than 58% in weight according to the invention. The machine according to this embodiment comprises a tape supplier (8), cutting blades (9), a heating unit (11), a cooling unit (12), a reel (13) for rolling the release paper and an ultrasonic compactor (3) comprising at least a probe (4), a probe housing (5), a booster (6) and a horn (7).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for obtaining a composite piece having a fiber volume greater than 58% in weight and with a porosity value lower than 2%, comprising the obtaining of a composite uncured laminate of n plies, at least one ply having a fiber volume greater than 58% in weight, the method comprising the steps of:
   a. laying a first prepreg ply over a working surface or a previously cured piece;
   b. performing ultrasound compaction over the first prepreg ply, the first prepreg ply thus becoming the last compacted prepreg ply;
   c. laying a new prepreg ply over the last compacted prepreg ply;
   d. performing ultrasound compaction over the new prepreg ply, the new prepreg ply thus becoming the last compacted prepreg ply;
   e. repeating steps c. and d. for n–2 additional times; and
   f. curing the composite uncured laminate of n plies;
   wherein n is a natural number equal or greater than 1,
   wherein at least one of the prepreg plies has a fiber volume greater than 58% in weight, and wherein the steps b. and d. of performing ultrasound compaction over a prepreg ply comprise at least applying an ultrasonic compactor over said prepreg ply, the ultrasonic compactor comprising at least a probe, a probe housing, a booster and a horn,
   wherein step b. is carried out using the following parameters:
   the ultrasonic frequency being comprised between 20 and 80 kHz;
   the ultrasonic waves amplitude being comprised between 70 and 100% of the amplitude of the movement of the ultrasonic compactor;
   the booster ratio being comprised between 1:1.5 and 1:3;
   the layup speed of the ultrasonic compactor being comprised between 50 and 180 mm/s;
   the compaction pressure being comprised between 30 and 150 bar;
   the ultrasonic compactor contact area being comprised between 50 and 200 mm2;
   the horn width being comprised between 5 and 30 mm; and
   the probe housing angle respect the working surface, or the previously cured piece, being comprised between 15 and 65°.

2. A method for obtaining a composite piece having a fiber volume greater than 58% in weight and with a porosity value lower than 2%, comprising the obtaining of a composite uncured laminate of n plies, at least one ply having a fiber volume greater than 58% in weight, the method comprising the steps of:
   a. laying a first prepreg ply over a working surface or a previously cured piece;
   b. performing ultrasound compaction over the first prepreg ply, the first prepreg ply thus becoming the last compacted prepreg ply;
   c. laying a new prepreg ply over the last compacted prepreg ply;
   d. performing ultrasound compaction over the new prepreg ply, the new prepreg ply thus becoming the last compacted prepreg ply;
   e. repeating steps c. and d. for n–2 additional times; and
   f. curing the composite uncured laminate of n plies;
   wherein n is a natural number equal or greater than 1,
   wherein at least one of the prepreg plies has a fiber volume greater than 58% in weight, and wherein the steps b. and d. of performing ultrasound compaction over a prepreg ply comprise at least applying an ultrasonic compactor over said prepreg ply, the ultrasonic compactor comprising at least a probe, a probe housing, a booster and a horn,
   wherein step b. is carried out using the following parameters:
   the ultrasonic frequency being comprised between 20 and 80 kHz;
   the ultrasonic waves amplitude being comprised between 70 and 100% of the amplitude of the movement of the ultrasonic compactor;
   the booster ratio being comprised between 1:1.5 and 1:3;
   the layup speed of the ultrasonic compactor being comprised between 50 and 180 mm/s;
   the compaction pressure being comprised between 30 and 150 bar;
   the ultrasonic compactor contact area being comprised between 50 and 200 mm2;

the horn width being comprised between 5 and 30 mm; and the probe housing angle respect the working surface, or the previously cured piece, being comprised between 15 and 65°, wherein step b. further comprises applying a heating unit before performing ultrasound compaction over the laid prepreg ply.

3. The method according to claim 2, wherein the heating unit is an infrared unit.

4. A method for obtaining a composite piece having a fiber volume greater than 58% in weight and with a porosity value lower than 2%, comprising the obtaining of a composite uncured laminate of n plies, at least one ply having a fiber volume greater than 58% in weight, the method comprising the steps of:

a. laying a first prepreg ply over a working surface or a previously cured piece;

b. performing ultrasound compaction over the first prepreg ply, the first prepreg ply thus becoming the last compacted prepreg ply;

c. laying a new prepreg ply over the last compacted prepreg ply;

d. performing ultrasound compaction over the new prepreg ply, the new prepreg ply thus becoming the last compacted prepreg ply;

e. repeating steps c. and d. for n−2 additional times; and f. curing the composite uncured laminate of n plies;

wherein n is a natural number equal or greater than 1, wherein at least one of the prepreg plies has a fiber volume greater than 58% in weight, and wherein the steps b. and d. of performing ultrasound compaction over a prepreg ply comprise at least applying an ultrasonic compactor over said prepreg ply, the ultrasonic compactor comprising at least a probe, a probe housing, a booster and a horn, wherein step b. is carried out using the following parameters:

the ultrasonic frequency being comprised between 20 and 80 kHz;

the ultrasonic waves amplitude being comprised between 70 and 100% of the amplitude of the movement of the ultrasonic compactor;

the booster ratio being comprised between 1:1.5 and 1:3;

the layup speed of the ultrasonic compactor being comprised between 50 and 180 mm/s;

the compaction pressure being comprised between 30 and 150 bar;

the ultrasonic compactor contact area being comprised between 50 and 200 mm2;

the horn width being comprised between 5 and 30 mm; and the probe housing angle respect the working surface, or the previously cured piece, being comprised between 15 and 65°, wherein step b. further comprises applying a cooling unit after performing ultrasound compaction over the laid prepreg ply.

5. The method according to claim 1, wherein step f. comprises curing the composite uncured laminate in a curing machine.

6. The method according to claim 5, wherein the curing machine is an autoclave.

* * * * *